United States Patent [19]

Spiewak

[11] 3,869,431

[45] Mar. 4, 1975

[54] POLYAMIDES AND THEIR PRODUCTION
[75] Inventor: John Walter Spiewak, Akron, Ohio
[73] Assignee: The Firestone Tire & Rubber Company, Akron, Ohio
[22] Filed: Mar. 12, 1973
[21] Appl. No.: 340,125

[52] U.S. Cl. .................. 260/78 L, 260/239.3
[51] Int. Cl. .............................. C08g 20/10
[58] Field of Search .............. 260/78 L, 78 P

[56] References Cited
UNITED STATES PATENTS
3,060,153  10/1962  Follett .................... 260/78 P
3,063,966  11/1962  Kwolek et al. ........... 260/78 R
3,600,350  8/1971  Kwolek .................. 260/78 R
3,671,499  6/1972  Moyer ................... 260/78 L

OTHER PUBLICATIONS

Donaruma et al., Journal of Heterocyclic Chemistry, Vol. 1 No. 1 (Feb. 1964) pp. 48–50 QD 400 J6.

Primary Examiner—Lucille M. Phynes

[57] ABSTRACT

Polyamides are produced by reacting a nitro acid chloride with a lactam the product of which is reduced to the corresponding amino-imide and then heated to split off lactam and obtain a polyamide which is useful for the manufacture of fibers, etc.

7 Claims, 1 Drawing Figure

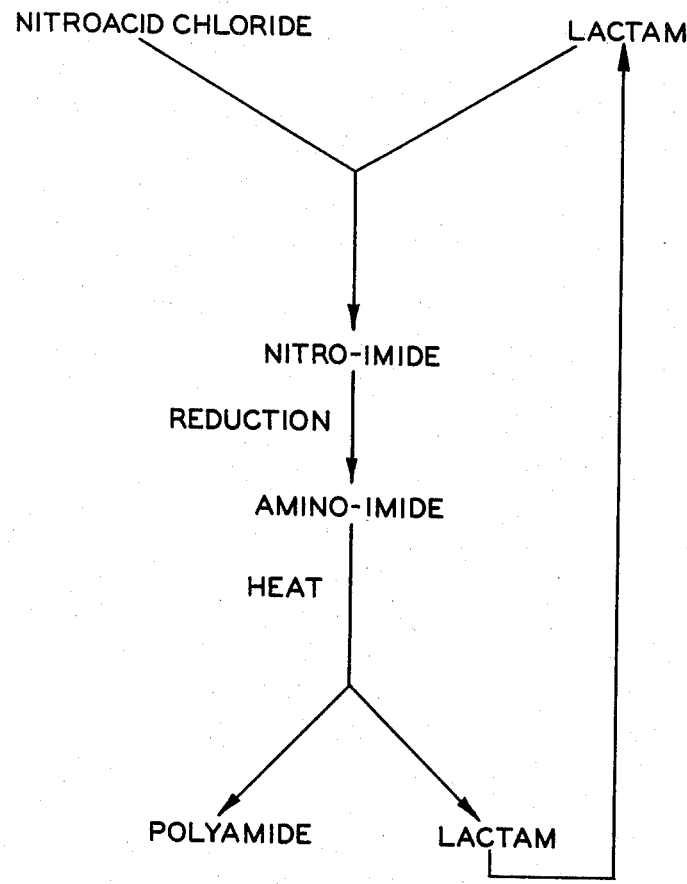

POLYAMIDES AND THEIR PRODUCTION

The invention relates to a novel method of producing polyamides. Copolyamides may be produced which are new.

Polyamides have found wide use in industry as source materials for fibers, films, molded products, etc. The products of this invention may be similarly employed. The by-product of the polyamide formation step is a lactam which can be recycled and re-used, as opposed to conventional methods which utilize acid chlorides as starting materials and after polymerization evolve hydrogen chloride which cannot be recycled. (See, for example, KWOLEK U.S. Pat. Nos. 3,600,350 and 3,063,966). These acid chlorides used in conventional preparations are moisture-sensitive, whereas the monomers utilized in this invention are not moisture-sensitive and can be handled freely in the atmosphere. This is a definite advantage, particularly in commercial production.

The polyamides which are produced may be aromatic or aliphatic. Various routes are available to aliphatic polyamides, but the routes available to aromatic polyamides are less numerous. This invention presents a new route to the preparation of aromatic polyamides which has advantages mentioned above.

The process utilized in carrying out the invention may utilize no solvent or may be carried out with a solvent; however since it is possible to omit the cost involved in the use of solvent, the process is preferably carried out in a solid state.

The process of this invention involves the heating of an amino-imide to produce the desired polyamide and lactam as a by-product. In producing the amino-imide, the lactam which has been recovered from a prior operation or from any other source is reacted with a nitroacid chloride to produce a nitro-imide which, on reduction, produces the amino-imide which is heated to produce the polyamide. Although this is the preferred procedure, the amino-imide may be obtained from any source.

The amino-imides may be aromatic or aliphatic.

The aromatic amino-imides may be represented by the following general formula:

$$H_2N-A-C(=O)-N\underset{(CH_2)_x}{\big\langle}$$

in which:

$x$ is 3 to 5 and A represents divalent organic radicals such as:
p-phenylene
m-phenylene
1,5-naphthylene
2,6-naphthylene
3,3'-biphenylene
4,4'-biphenylene
and divalent organic radicals derived from ⟨O⟩-B-⟨O⟩-  or  ⟨O⟩-B-⟨O⟩ wherein B is preferably one of the following groups:

$-O-$, $-\overset{O}{\underset{\|}{C}}-$, $-HN-\overset{O}{\underset{\|}{C}}-NH-$, $-HN-\overset{O}{\underset{\|}{C}}-O-$, $-\overset{O}{\underset{\|}{C}}-NH-$, $-\overset{O}{\underset{\|}{C}}-O-$, $-S-$, $-\overset{O}{\underset{\|}{S}}-$, $-\overset{O}{\underset{\underset{O}{\|}}{\overset{\|}{S}}}-$ or $-\overset{Z}{\underset{Z}{\overset{|}{C}}}-$ in which Z is a hydrogen or a lower alkyl group.

Examples of aromatic amino-imides are: p-aminobenzoyl-N-epsilon-caprolactam, p-aminobenzoyl-N-deltavalero-lactam, p-aminobenzoyl-N-gamma-butyrolactam and the corresponding m-aminobenzoyl-N-lactam derivatives, 4-(p-aminophenoxy)-benzoyl-N-caprolactam, 4-(p-aminobenzoyl)-benzoyl-N-caprolactam, N-p-aminophenyl-N'-(p-benzoyl-1-caprolactam) urea, p-aminophenyl-N-(p-benzoyl-1-caprolactam)carbamate, p-benzoyl-1-caprolactam-N-(p-aminophenyl)carbamate, 4-(p-aminobenzamido)benzoyl-N-caprolactam, 4-(p-aminophenylcarboxy)-benzoyl-N-caprolactam, 4-(p-aminothiophenoxy)-benzoyl-N-caprolactam, 4-(p-aminophenysulfinyl)-benzoyl-N-caprolactam, 4-(p-aminophenylsulfonyl)-benzoyl-N-caprolactam, 4-(p-aminophenylmethylene)-benzoyl-N-caprolactam and the corresponding valerolactam and butyrolactam derivatives, etc.

Although the invention relates more particularly to the treatment of the aromatic amino-imides, aliphatic amino-imides may be used such as, for example, those illustrated by the following general formula:

$$H_2N-A'-C(=O)-N\underset{(CH_2)_x}{\big\langle}$$

in which:

$x$ is 3 to 5 and A' represents alkyl and branched alkyl organic radicals containing up to one to 30 carbon atoms in which the following heteroatoms and/or functional groups may be interdispersed:

$-O-$, $-\overset{O}{\underset{\|}{C}}-$, $-HN-\overset{O}{\underset{\|}{C}}-NH-$, $-HN-\overset{O}{\underset{\|}{C}}-$, $-HN-\overset{O}{\underset{\|}{C}}-O-$, $-\overset{O}{\underset{\|}{C}}-O-$, $-S-$, $-\overset{O}{\underset{\|}{S}}-$ and $-\overset{O}{\underset{\underset{O}{\|}}{\overset{\|}{S}}}-$.

Illustrative examples are: aminoacetyl-N-epsilon-caprolactam, aminoacetyl-N-delta-valerolactam, aminoacetyl-N-gamma-butyrolactam, beta-aminoisobutyryl-N-caprolactam, alpha-aminoisobutyryl-N-caprolactam, aminomethyleneoxyacetyl-N-caprolactam and epsilon-aminocaproyl-N-caprolactam. These examples are not intended to include all possibilities within the above structural formulation.

As indicated, an advantage of the process disclosed, and particularly in the solid state polymerization process is the possible re-use of the lactam obtained as a by-product. The lactams which may be used in carrying out the invention are represented by the following formula:

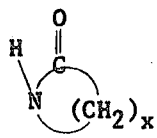

in which $x = 3$ to 5.

Representative lactams are: gamma-butyrolactam, deltavalerolactam and epsilon-caprolactam.

In the cyclic process, a lactam is reacted with a nitroacid chloride. This chloride may be an aromatic compound such as represented by the following general formula:

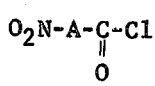

in which
A represents a divalent organic radical such as:
p-phenylene
m-phenylene
1,5-naphthylene
2,6-naphthylene
3,3'-biphenylene
4,4'-biphenylene and divalent organic radicals derived from

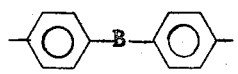 or 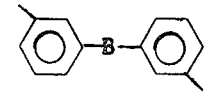

wherein B is preferably one of the following groups:

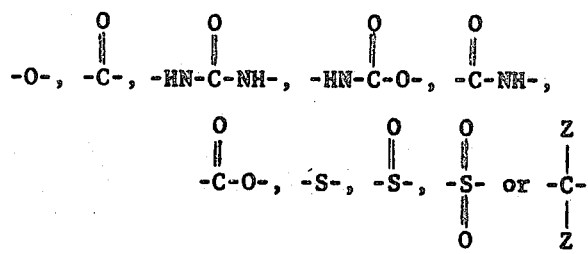

in which Z is a hydrogen or a lower alkyl group.

Representative compounds are: p-nitrobenzoyl chloride, 4-(p-nitrophenoxy)-benzoyl chloride, 4-(p-nitrobenzoyl)-benzoyl chloride, 4-(p-nitrophenylcarboxy)-benzoyl chloride, 4-(p-nitrothiophenoxy)-benzoyl chloride, 4-(p-nitrophenylsulfinyl)-benzoyl chloride, 4-(p-nitrophenylsulfonyl)-benzoyl chloride, 4-(p-nitrophenylmethylene)-benzoyl chloride and the corresponding meta nitro-3 benzoyl chloride derivatives, etc.

Aliphatic nitro-acid chlorides are represented by the following general formula:

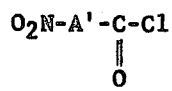

in which
A' represents alkyl and branched alkyl organic radicals containing up to 30 carbon atoms in which the following heteroatoms and/or functional groups may be interdispersed: —O—,

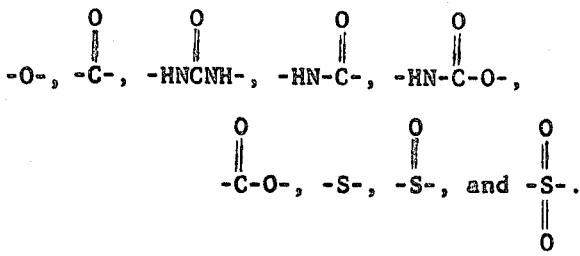

Representative compounds are: nitroacetyl chloride, beta-nitroisobutyryl chloride, alpha-nitroisobutyryl chloride, nitromethyleneoxyacetyl chloride, epsilon-nitrocaproyl chloride, beta-(beta-nitroethanesulfonyl)-propanoyl chloride, beta-(beta-nitroethanesulfinyl)-propanoyl chloride, beta-(beta-nitroethanethio)-propanoyl chloride.

The reaction of the nitro-acid chloride with the lactam, followed by the reduction of the reaction product, and then heating the reduced product to produce the polyamide with release of lactam which is re-used, may be represented by the following equation which utilizes the foregoing formulae:

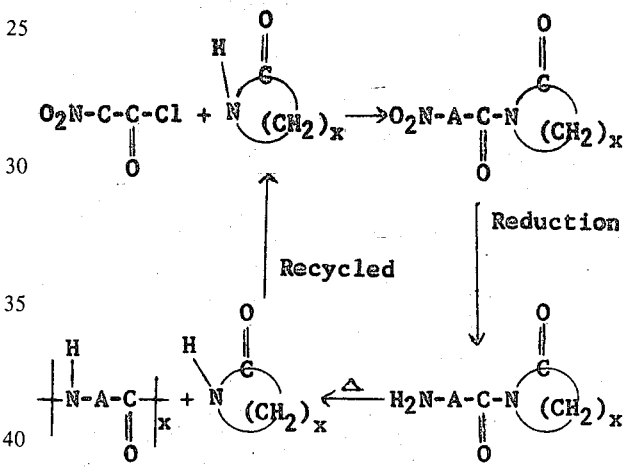

wherein A and x are as previously defined.

The reaction of the nitro-acid chloride with a lactam, followed by reduction of the reaction product, is described by Donaruma et al. in an article entitled "N-ACYL DERIVATIVES OF CAPROLACTAM", published in Journal of Heterocyclic Chemistry, 1, 48–50 (1964). It should be pointed out that synthetic routes, other than the previously described nitro-acid chloride-lactam reduction sequence, can be utilized to prepare the polymerizable amino-imides. Such routes are particularly useful in the preparation of amino-imides containing other functional groups.

Any suitable reduction process may be used for the reduction of the nitro-imide to an amino-imide, such as, for example, the use of hydrogen with any suitable hydrogenation catalyst, etc.

The heating of any amino-imide to liberate a lactam and produce a polyamide is believed to be new, and this is a valuable commercial procedure. The polyamide produced may be aromatic or aliphatic, depending upon the nature of the amino-imide which is heated. The invention contemplates the heating of a mixture of amino-imides to produce a copolymer. The mixture may be a mixture of aromatic amino-imide, or a mixture of aliphatic amino-imides, or, as a third possibility, it may be a mixture of an aromatic amino-imide and an aliphatic amino-imide in which case the copolymer produced is a copolymer having properties characteristic of both aromatic and aliphatic polyamides. To illustrate the latter type of copolymer, there is given here the above general formulae of aromatic and aliphatic amino-imides. The polymerization process in which the imides are broken down may be illustrated by the following, in which the formulae for an aromatic amino-imide and for an aliphatic amino-imide, both of which contain the same lactam group, are given, using the same symbols as in the foregoing.

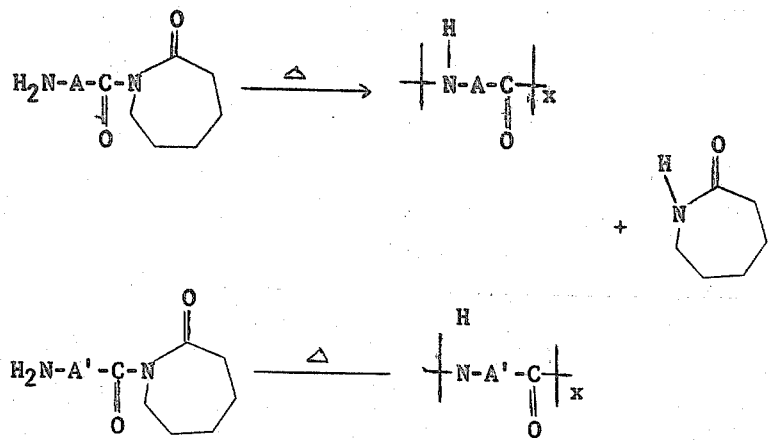

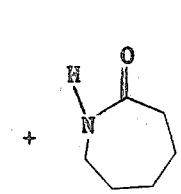

wherein A and A' are as previously defined.

In the following description of the reaction which takes place in the production of a copolymer, there is reference to a ring-containing carbonyl group and a non-ring-containing group. The ring-containing carbonyl is included in the lactam ring and the remaining carbonyl is the non-ring-containing carbonyl.

The copolymer arises from the reaction of an aliphatic amine of the aliphatic amino-imide with the non-ring-containing carbonyl of the aromatic amino-imide, or the amine group from the aromatic amino-imide reacts with the non-ring-containing carbonyl of the aliphatic amino-imide.

Of course, by heating two aromatic amino-imides of different formulae, or two aliphatic amino-imides of different formulae, copolymers may be obtained which are either aromatic or aliphatic.

The cyclic procedure involves much prior art and one example illustrating a solid state reaction and one illustrating a reaction carried out in solution are all that are required to illustrate the invention.

EXAMPLE I

Novel Process for the Preparation of Poly P-Benzamide in the Solid State

A four-gram sample of p-aminobenzoyl-N-caprolactam (m.p. 150°–1° C.) was charged into a miniature resin kettle and the vessel was purged with nitrogen and then immersed in a Woods Metal bath at 145° C. A vacuum (= 1.0 mm. Hg) was immediately applied and was maintained for 21.5 hours with the temperature in the range of 150°–165° C. Stirring was not conducted but is optional. The sublimed solid at the top of the reaction vessel possessed a melting point of 69° C. and had an infrared spectrum identical to an authenic sample of caprolactam. The beige-colored solid at the bottom of the reaction vessel had an inherent viscosity of 0.35 (0.5% g/dec.) in concentrated sulfuric acid. The solid was pulverized to a fine powder and was submitted to further polymerization at 310° C. under similar vacuum for 1 hour. The inherent viscosity increased to 1.27. The same sample was further polymerized under vacuum at 355°–370° C. for 1 hour and the resulting light-brown solid displayed an inherent viscosity of 2.00. The concentrated sulfuric acid solution of the final polymer contained a small amount of gel such that the maximum spread in solution flow times was 1.5% in a No. 100 Ostwald viscosimeter.

Although generally the procedure will be based on the foregoing example in which the reaction is carried out in the solid state, it is possible to carry out the reaction in suspension. The following example is illustrative.

EXAMPLE II

Novel Process for the Preparation of Poly P-Benzamide in Suspension

A five-gram sample of p-aminobenzoyl-N-caprolactam (M.p. 150°–1° C.) was mixed with 70 ml. of Dowtherm A (eutectic mixture of diphenyl and diphenyl oxide) in a miniature resin kettle and, under a blanket of nitrogen, the resin kettle was immersed in a Woods Metal bath at 100° C. The initial mixture was totally solubilized after 35 minutes at which time the temperature of the Woods Metal bath was allowed to increase to 162° C. The bath temperature was further increased to 240° C. after an additional 75 minutes and two layers were formed, the bottom layer containing precipitated solid. The mixture was allowed to stir for an additional 69.5 hours under nitrogen at 250°–260° C., and after cooling the precipitate was collected and washed with copious amounts of methanol. The polymer was dried at 70°–90° C. for 17 hours at a pressure of = 1 mm. Hg. and was found to have an inherent viscosity of 0.97 (0.5% g/dec.) in concentrated sulfuric acid. A total solution resulted. No gel was observed in the viscous solution.

No gel is obtained when the process is carried out in suspension, as illustrated; whereas, a small amount of gel was obtained in the process carried out in the solid state. However, the process as carried out in the solid state yielded a higher viscosity polymer.

The foregoing examples are illustrative. In commercial production adjustments will be made as, for example, the polymerization will normally be carried out by continuous heating. In fact, the process may be adapted to continuous operation in which the recycling of the lactam would be continuous. The drawing is a flow sheet of such an operation. The lactam produced in the production of copolyamides may be similarly recycled.

Commercially, for carrying out the reaction in a solid state a temperature of 100° to 400° C. and a pressure of 0.1 to 1.0 mm. Hg and preferably 0.1 to 0.5 mm. Hg will be used. For reaction in suspension a temperature of 100° C. to the boiling point of the solvent, or preferably a temperature of about 150° to 250° C. will be used. The foregoing temperatures are suggestive, because the temperature employed will depend upon the particular amino-imides that are treated.

I claim:

1. The process of producing a solid polyamide which comprises heating an aliphatic and/or aromatic amino-imide to liberate lactam and thus obtain polyamide, the lactam having the formula

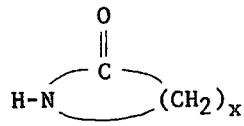

in which $x$ equals 3 to 5, the reaction when in the solid state being carried out at a temperature of 100° to 400° C., and when carried out in suspension in a solvent being carried out at a temperature of 100° C. to the boiling point of the solvent.

2. The process of claim 1 in which an aromatic amino-imide is heated and an aromatic polyamide is produced.

3. The process of claim 1 in which an aliphatic amino-imide is heated and an aliphatic polyamide is produced.

4. The process of claim 1 in which a mixture of an aromatic and an aliphatic amino-imide is heated and a copolymer is produced.

5. The process of claim 1 in which p-aminobenzoyl-N-lactam is heated and poly-p-benzamide is produced.

6. The process of claim 1 carried out in a solid state.

7. The process of claim 1 carried out in suspension.

* * * * *